United States Patent

Göransson et al.

[11] Patent Number: 6,119,547
[45] Date of Patent: *Sep. 19, 2000

[54] AUTOMATIC BALANCING DEVICE

[75] Inventors: Bo Göransson, Göteborg; Jonas Nilsagård, Partille, both of Sweden

[73] Assignee: Aktiebolaget SKF, Gothenburg, Sweden

[*] Notice: This patent issued on a continued prosecution application filed under 37 CFR 1.53(d), and is subject to the twenty year patent term provisions of 35 U.S.C. 154(a)(2).

[21] Appl. No.: 09/066,360
[22] PCT Filed: Oct. 30, 1996
[86] PCT No.: PCT/SE96/01417
§ 371 Date: Jul. 13, 1998
§ 102(e) Date: Jul. 13, 1998
[87] PCT Pub. No.: WO97/16657
PCT Pub. Date: May 9, 1997

[30] Foreign Application Priority Data

Oct. 30, 1995 [SE] Sweden ................... 9503807

[51] Int. Cl.[7] ................ F16F 15/22; G05G 1/00
[52] U.S. Cl. ............... 74/573; 74/572; 74/574; 68/23.2; 464/36; 464/38; 210/144; 210/363; 210/364
[58] Field of Search ............. 74/572–574; 68/23.2; 210/144, 363, 364; 464/36, 38

[56] References Cited

U.S. PATENT DOCUMENTS

| | | |
|---|---|---|
| 414,642 | 11/1889 | Herrick ................... 74/573 R |
| 2,984,094 | 5/1961 | Belaieff . |
| 3,089,326 | 5/1963 | Belaieff . |
| 3,109,321 | 11/1963 | Rogers ................... 74/573 R |
| 3,346,303 | 10/1967 | Wesley . |
| 3,696,688 | 10/1972 | Goodrich et al. . |
| 4,467,902 | 8/1984 | Girguis ................... 464/36 X |
| 4,988,327 | 1/1991 | Orain ................... 464/111 |
| 5,460,017 | 10/1995 | Taylor ................... 68/23.2 |
| 5,761,932 | 6/1998 | Kim ................... 68/23.2 |
| 5,806,349 | 9/1998 | Kim et al. ................... 68/23.2 |
| 5,850,748 | 12/1998 | Kim et al. ................... 68/23.2 |

FOREIGN PATENT DOCUMENTS

| | | |
|---|---|---|
| 35 09 089 | 6/1988 | Germany . |
| 60-215137 | 10/1985 | Japan ................... 74/573 F |
| 719422 | 12/1954 | United Kingdom . |
| 832048 | 4/1960 | United Kingdom . |

*Primary Examiner*—Vinh T. Luong
*Attorney, Agent, or Firm*—Burns, Doane, Swecker & Mathis, L.L.P.

[57] ABSTRACT

An automatic balancing device for rotary units or systems. The automatic balancing device includes an annular housing, and an annular outer race track disposed in the annular housing. The outer race track is concentric with and attachable to the rotary system so as to rotate with the rotary system. A number of roller bodies are disposed in the annular housing and are freely movable along the race track for dynamic and/or static contact therewith during rotation of the rotary unit or system. The outer racetrack is provided in a separate ring of a large diameter having a torus-shaped groove forming the race track and having a curved concave profile facing the center of the separate ring.

21 Claims, 2 Drawing Sheets

AUTOMATIC BALANCING DEVICE

DESCRIPTION OF THE RELATED ART

The present invention refers to an auto-balancing device for rotary units or systems, having an annular outer race track disposed in a closed, substantially annular housing arranged substantially concentric with and attached to the rotary unit or system, for rotating with the rotary unit or system, and a number of rolling bodies disposed in the housing and freely movable along the race track for dynamic and/or static contact therewith during rotation of the rotary system.

SUMMARY OF THE INVENTION

In different rotary units or systems, such as rotating washing machine drums, bladed ceiling fans, vehicle wheels, etcetera, there occur large unbalance forces, which should be eliminated as far as possible to give a reduced operation noise for the rotary system, a reduction of vibrations, thereby also reducing the necessity of using other stabilizing means, such as heavy machine beds, etcetera, and also to allow a high rotational speed, which at least for a washing machine drum, is essential for obtaining a desired centrfugal force for expelling water from the material washed in the machine, and for preventing damages to the machine base and the shaft bearings wherein the rotary system is supported. For this purpose it has earlier been proposed auto-balancing devices having a ringformed, sealed and fluid-filled chamber and inserted therein a number of rolling bodies not filling more than a portion of the said chamber and moving independently to different positions along the annular chamber to counter-act unbalance during rotation.

Thus U.S. Pat. No. 2,984,094 refers to a washing machine having a race track formed by a flat steel band applied elastically to the wall of the housing. The large rolling elements used in this earlier known device thus roll against a flat surface, whereby the rolling bodies have small stability in the axial direction.

GB-A-832,048 proposes for a similar purpose using commercially available anti-friction bearing parts as housing and race track for such auto-balancing devices, but such solutions would be very expensive and heavy if used in large diameter applications.

SUMMARY OF THE INVENTION

The purpose of the present invention is to provide an auto-balancing device for rotary systems, by means of which the rolling bodies will have a radially and axially exactly positioned race track, thereby reducing contact stresses, whereas the entire device is simple and therefore highly flexible in design and provides an efficient and yet in-expensive solution. This has been obtained by a device having the features described below.

BRIEF DESCRIPTION OF THE DRAWINGS

Hereinafter the invention will be further described with reference to embodiments shown in the accompanying drawings.

DETAILED DESCRIPTION OF THE PREFERRED EMBODIMENTS

Figure 1:
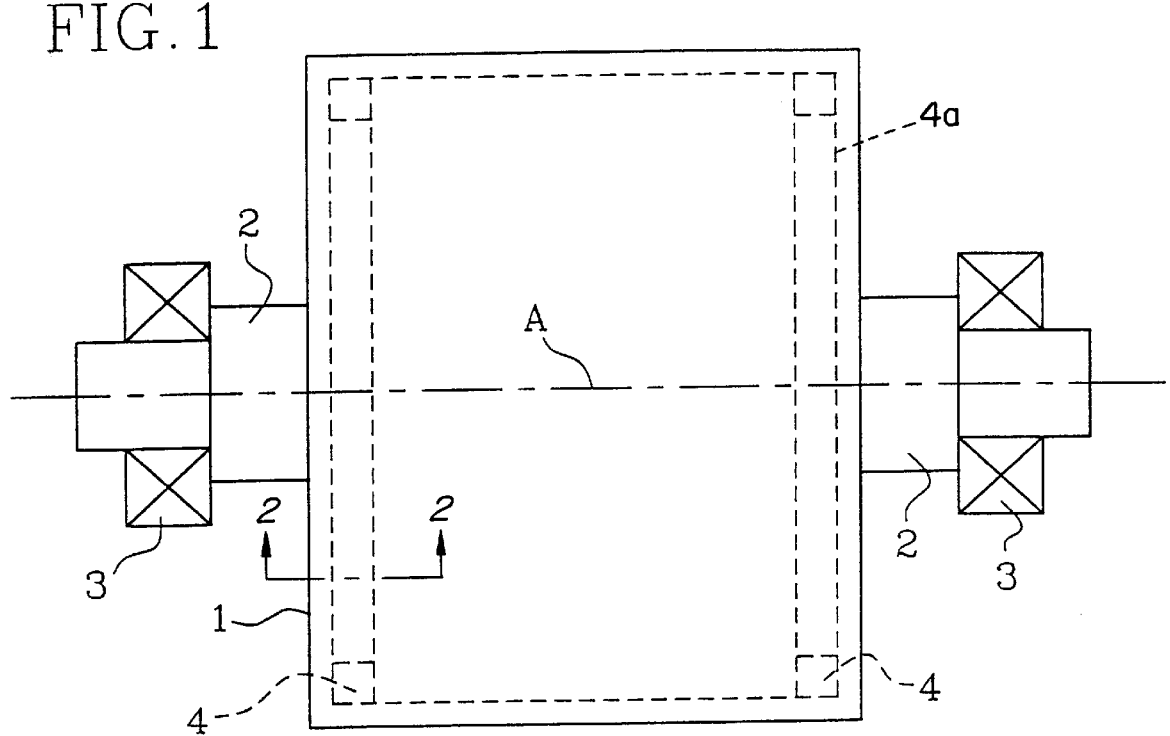
FIG. 1 shows schematically a washing machine drum, with bearings and auto-balancing devices according to the invention intimated one at each gable wall of the drum.

FIG. 1 shows in a diagrammatic manner a rotary system, such as a cylindrical washing machine drum 1, having concentric stub axles 2 extending one form each gable wall of the drum 1 and being journalled in a housing (not shown) in rolling bearings 3. It is evident that such a rotary system, will be subjected to large unbalance forces during rotation as the washing goods seldom will be evenly distributed throughout the drum, but will often gather at a small sector of the drum, displaced and well spaced from the centre of the drum. Similar phenomena caused by manufacturing tolerances, by dirt and the like, applies also to other types of rotary systems, such as bladed ceiling fans, vehicle wheels and the like. For compensating and reducing the unbalance each gable region of the drum in the embodiment according to FIG. 1, therefore is provided with an autobalancing device 4 according to one embodiment of the present invention. Each one of these autobalancing devices 4 is constituted by an annular housing 4a positioned concentric with the centre axis A of the washing machine drum 1. The housing 4a of the autobalancing device in FIG. 1 is illustrated as having a quadrangular cross-section, but as shown later on, this cross-section might be of other forms, e.g. circular, etcetera.

Figure 2:
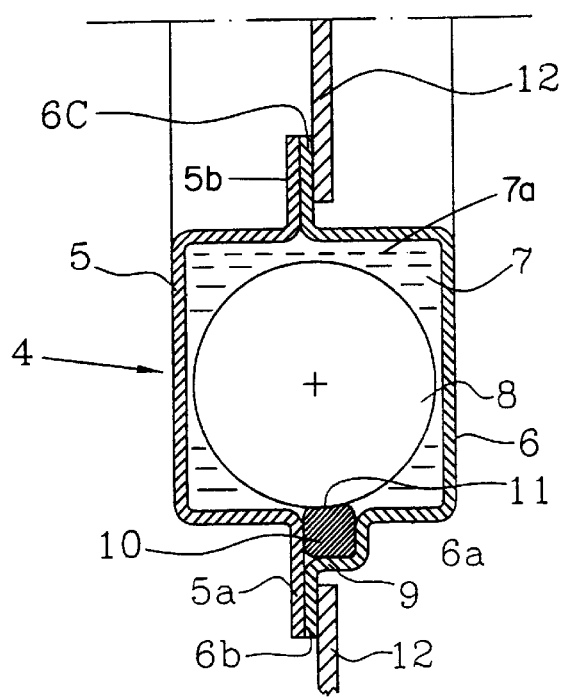
FIG. 2 is a larger scale cross-sectional view through a portion of the auto-balancing device intimated in FIG. 1, taken along the line 2—2 of FIG. 1.

FIG. 2 illustrates a cross-section through a first embodiment of the autobalancing device 4 according to the invention.

In the embodiment shown in FIG. 2 the autobalancing device 4 has a housing constituted by a first housing 4a half shaped as a substantially through-formed annulus 5 and a second housing half shaped as a through-formed annulus 6, which are interconnected in a liquid-proof manner along their flanged rims 5a, 6a and 5b, 6c to form together an annular channel 7 in which are enclosed a number of large rolling bodies 8, which during operation act as unbalance compensating weights. The remaining space of the annular channel 7 is at least partly filled with a damping liquid, 7a e.g. oil, which also has an effect during operation of pulling along the rolling bodies 8 until they have settled in their balancing positions.

The outer flanged rim 5a of the first housing half 5 and the outer flanged rim 6a of the second housing half 6 in interconnected position form between them a seat 9 for a separate race track ring 10 having a torus-shaped section forming a groove 11 with a curved concave profile facing the centre of the ring 10. The groove 11 of the race track ring 10 in mounted position is concentric with the axis A of the rotary system and in mounted position the race track ring 10 is given radial rigidity and axial alignment by the seat 9 in which the race track ring 10 is firmly attached, e.g. by clamping, by press fit, by glueing or the like. The seat surface in the seat 9 and the torus-shaped groove 11 furthermore are also preferably concentric to each other. The torus-shaped groove 11 of the race track ring 10 has a hard, substantially smooth surface, and although it is almost to be considered as a wire ring and in spite of its slender shape, it will provide a well defined race track for the rolling bodies 10. Therefore the flanged rims 5a and 6a are positioned just outside the race track ring, thereby providing radial rigidity to the ring 10, i.e. in the direction of the main forces from the rolling bodies 8, acting on the race track ring. In the embodiment shown, an extended flange 6b of rim 6a at the outer side of the second housing half 6 and the inner flanged rim 6c of said housing half 6 are used for firmly connecting the housing of the autobalancing device to supporting plates 12 or the like, which contribute in increasing the rigidity and stability of the large-diameter loop formed by the race track wire 10. These supporting plates 12 can be a gable of the washing machine drum 1.

Figure 3:
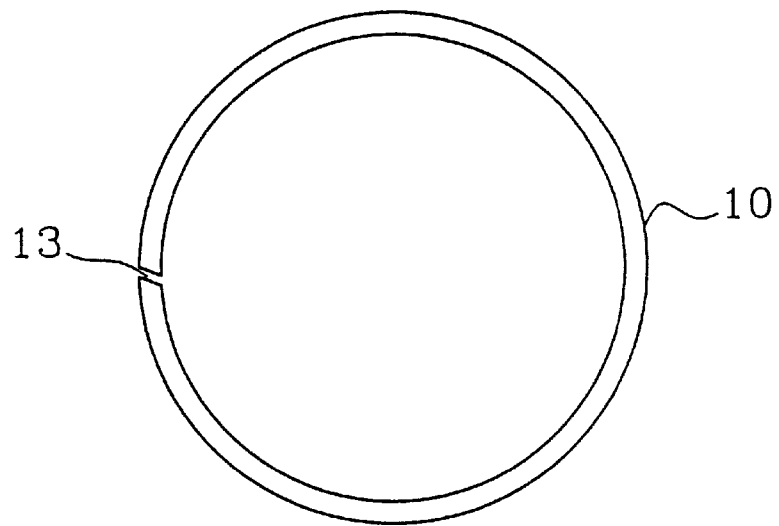
FIG. 3 shows schematically a planar view of one embodiment of a race track ring forming part of the auto-balancing device according to the invention.

As shown in FIG. 3 the thread-formed race track ring 10 can be formed from a straight thin rod or wire, which is bent to an annular shape and having its ends fixedly connected, e.g. by a butt welding joint 13. The ends of the bar or wire can also be cut obliquely, thus that the ring 12 is not a closed loop but has a oblique slot (not shown).

The housing portions 5, 6 are preferably formed from sheet metal profiles, which are easily shaped, assembled and fixedly connected to a rotary portion of an large size rotary system, such as the washing machine drum 1. It thus is possible to assemble a entire autobalancing device 4 including filling it with damping liquid 7a, at a manufacturing site and to deliver it from there to manufacturer of the rotary system for easy fitting of the autobalancing device in the desired position.

The autobalancing device 4 according to the present invention can of course be directly integrated in the system to which it shall be applied. For a gable wall of the washing machine drum 1 can be used as a housing portion thereof, etcetera.

Figure 4:
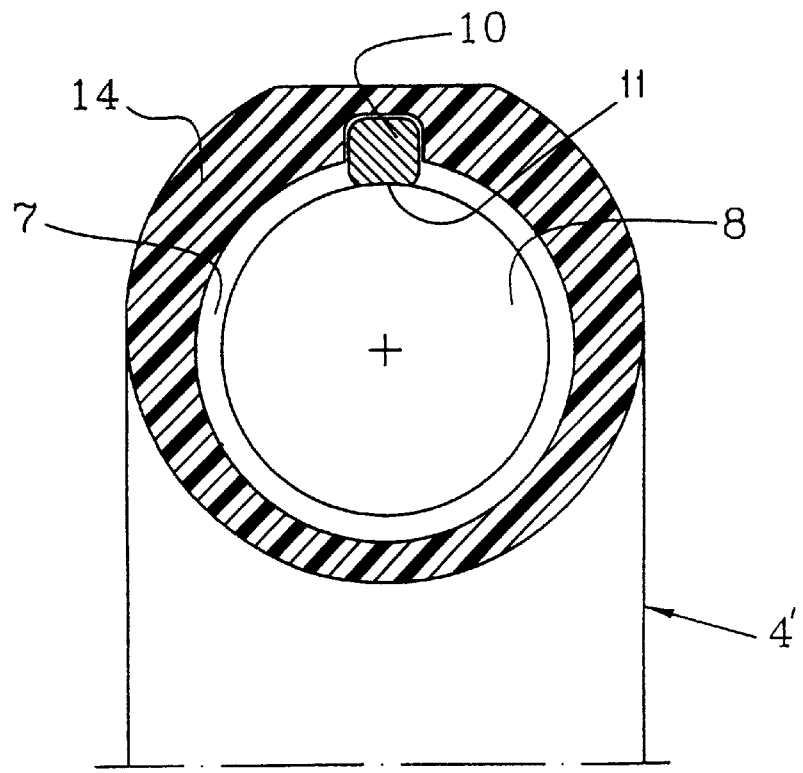
FIG. 4 is a modified embodiment of an auto-balancing device according to the invention.

In FIG. 4 finally is shown an autobalancing device 4' according to the invention, wherein the housing forming the channel 7 for the rolling bodies 8, is formed with a circular cross-section, preferably as a thick-walled hose or tube 14, made from a moldable material, preferably a plastic material, and where a race track ring 10, having the same properties and shape as those described in connection with the earlier embodiment, preferably is embedded in the tube material.

The previously described groove 11 defining the race track in the race track ring 10 shall preferably be of a somewhat bigger radius of curvature than the sphere radius of the rolling body 8, and the rolling body radius shall most preferably be 70–95% of the torus radius of the race track groove. The rolling bodies 8 and the material of the race track ring shall preferably have substantially the same hardness and/or yield strength.

The invention is not limited to the embodiments shown in the drawings and described in connection thereto, and modifications and variations are possible within the scope of the appended claims. Although the auto-balancing device according to the invention has been shown and described as provided at a large size rotary system, it is in no way limited thereto, in spite of the fact that it have its most evident advantages in connection with such large size rotary systems.

What is claimed is:

1. A system comprising:
    a rotary system having an axis, and
    an automatic balancing system, the automatic balancing system including
        an annular housing;
        an annular outer race track disposed in said annular housing and being arranged concentric with and attached to said rotary system so as to rotate with said rotary system; and
        a number of rolling bodies disposed in said annular housing and freely moveable along said race track for at least one of dynamic contact and static contact with said race track during rotation of said rotary system, wherein said outer race track is provided in a separate ring having a torus-shaped groove forming said race track and having a curved concave profile facing the centre of the separate ring, said ring being fixedly inserted in a portion of said housing, formed as a seat for a seat-surface of the ring and which seat is arranged to stiffen the separate ring for permitting the ring to maintain the circular form of the ring in spite of forces acting upon the ring during operation, said torus-shaped groove being positioned concentric with the axis of the rotary system.

2. A device as claimed in claim 1, wherein the torus-shaped groove of the separate ring has a smooth surface.

3. A device as claimed in claim 1, wherein the separate ring includes a slender wire ring.

4. A device according to claim 1, wherein the rolling bodies are balls having a sphere radius, and the torus-shaped groove of the ring has a radius of curvature slightly larger than the sphere radius of the balls.

5. A device as claimed in claim 4, wherein the sphere radius of the balls is 70–95% of the radius of curvature of the torus-shaped groove in the separate ring.

6. A device as claimed in claim 1, wherein
    the separate ring is formed of a wire, bent into a loop and adapted to its circular shape by said seat in the housing.

7. A device as claimed in claim 6, wherein ends of the bent loop of wire forming the separate ring are fixedly interconnected.

8. A device as claimed in claim 6, wherein ends of the bent loop of wire forming the separate ring are configured and arranged to define an oblique slot between the ends of the loop of wire.

9. A device as claimed in claim 1, wherein the annular housing is defined by at least two through-shaped annular discs joined together at a joint to form between them an annular channel, a region of the joint having flanged rim portions, said flanged rim portions being joined together to define the seat for the separate ring.

10. A device as claimed in claim 9, wherein the flanged rim portions are shaped so as to clamp the separate ring in the seat.

11. A device as claimed in claim 1, wherein the annular housing is a molded, substantially toroidal tube forming a substantially circular channel, said separate ring being embedded in said tube.

12. A device as claimed in claim 1, wherein at least a part of the annular housing being a part of said rotary system.

13. A device as claimed in claim 2, wherein the separate ring is a slender wire ring.

14. A device as claimed in claim 1, wherein said separate ring and said rolling bodies have the same hardness.

15. A device as claimed in claim 7, wherein the ends of the loop of wire are fixedly interconnected by a welded joint.

16. A device as claimed in claim 12, wherein said part of said rotary system is a portion of a washing machine drum.

17. An automatic balancing device and a rotary system comprising:
    an annular housing having an interior;
    a plurality of roller bodies located in said interior of said annular housing; and
    an annular ring separate from said annular housing and located in said interior of said annular housing, said annular ring including an annular groove concavely curved in a direction toward a center of said annular ring, said annular groove defining an outer race track for said roller bodies; and a rotary system having a rotation axis and a rotatable portion, said annular ring and said race track being located concentric with the rotation axis of said rotary system, said annular ring being located radially farther away from said rotation axis than said roller bodies, said annular housing being attached to said rotatable portion of said rotary system such that said annular housing rotates with said rotatable portion when said rotatable portion rotates.

18. The automatic balancing device of claim 17, wherein said annular housing defines an annular seat that receives said annular ring.

19. The automatic balancing device of claim 18, wherein said housing is defined by two housing portions that have been joined together.

20. The automatic balancing device of claim 17, wherein said annular housing defines an annular seat that receives said annular ring, annular seat for preventing said annular ring from moving relative to said annular housing in a direction away from said rotation axis and in a direction parallel to said rotation axis.

21. The automatic balancing device of claim 17, wherein said annular housing is at least partially defined by a tube.

* * * * *